United States Patent [19]
Flaig

[11] Patent Number: 4,792,323
[45] Date of Patent: Dec. 20, 1988

[54] CHAIN GUIDE

[75] Inventor: Heinz Flaig, Bochum, Fed. Rep. of Germany

[73] Assignee: Mannesmann AG, Duesseldorf, Fed. Rep. of Germany

[21] Appl. No.: 76,028

[22] Filed: Jul. 21, 1987

[30] Foreign Application Priority Data

Jul. 22, 1986 [DE] Fed. Rep. of Germany ....... 3624793

[51] Int. Cl.$^4$ ........................ B62J 13/00; F16H 57/02
[52] U.S. Cl. ...................................... 474/144; 74/608; 254/372
[58] Field of Search ................ 474/140, 144, 145-147; 74/608; 180/84; 280/160, 160.1, 152 R, 152.1, 152.2, 159; 254/372, 383

[56] References Cited

U.S. PATENT DOCUMENTS

| | | | |
|---|---|---|---|
| 2,773,668 | 12/1956 | Robins et al. | 254/372 |
| 3,766,792 | 10/1973 | Braun et al. | 474/144 |
| 4,648,855 | 3/1987 | Palloch et al. | 474/144 |
| 4,683,771 | 8/1987 | Sogo et al. | 74/608 X |

*Primary Examiner*—Thuy M. Bui
*Attorney, Agent, or Firm*—Ralf H. Siegemund

[57] ABSTRACT

Chain guide for and in relation to a chain or sprocket wheel and being made of a pair of complimentary guide shells made as press parts and having when put together a pair of vertically extending cross shaped grooves; guide noses extend above the grooves and facing each other across a narrowing closable gap and above a shaft and groove bottom portion of the sprocket wheel.

2 Claims, 1 Drawing Sheet

CHAIN GUIDE

BACKGROUND OF THE INVENTION

The present invention relates to guiding a chain and more particularly to guiding a chain that runs over and through a sprocket wheel with additional guide structures such as grooves being provided for particular guiding the chain on a prescribed path. The guiding structure may for instance be of bi-parted construction.

A guide structure of the type to which the invention pertains, particularly for chains, is shown in German Pat. No. 12 23 718. Here the structure is configured to be provided of two solid parts into which grooves have been milled for receiving the chain. This kind of chain guide reaches over and above the upper part of a chain sprocket wheel and, therefore, can be subjected to maintenance only after the entire chain has been dismantled. The same is true, of course, in the case any renewal is necessary. Moreover, it was found that the guide structure is very material extensive and, in addition, it is labor extensive as far as providing the requisite milling operation as concerned.

DESCRIPTION OF THE INVENTION

It is an object of the present invention to provide a new and improved chain guide which is simpler to make and can be renewed i.e. be subjected to maintenance and replacement procedure without dismantling and removing the entire chain. The same is true with regard to question of inspection.

In accordance with the preferred embodiment of the present invention, it is suggested to guide the chain by means of a bi-parted construction of guide pieces each made by pressworking under avoidance of milling and which have indents in a cross shaped configuration for receiving the chain noses extending from these guides above the sprocket and chain wheel bottom groove matching a curvature of the chain but leaving open a receiving gap for insertion of the sprocket and chain. Specifically the guide parts are made of stamped sheet parts each have T-shaped indents which upon being superimposed establish cross-shaped chain channels. The standing chain members will be guided and held by means of the aforementioned upper noses. The insertion gap permits insertion and removal of the chain without disassembly of other parts. The insertion gap may be closed after the chain guide has been installed through a closure piece which may be part of the casing. This permits inserting of the chain e.g. in case of a change of the chain is actually desired, without requiring any additional inserting aids.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a casing on and through which a chain 4 is run. In particular, the chain 4 engages sprockets of a sprocket wheel 3 which is journalled for rotation inside the housing 1. A particular guide structure is inserted into the housing 1 from and below which guide structure is configured as follows.

Figure 1:
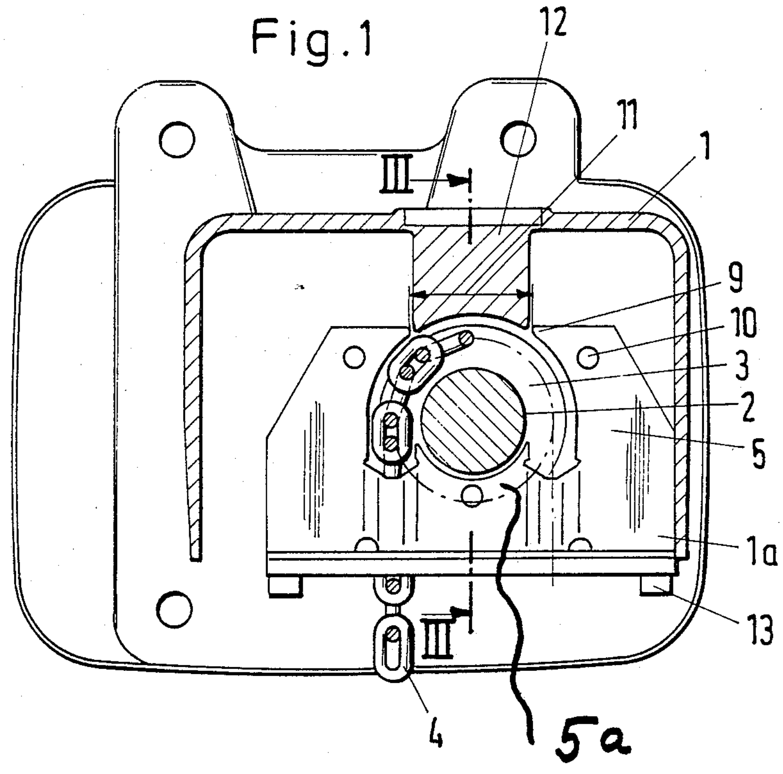
FIG. 1 illustrates a chain with chain guide improved in accordance with the preferred embodiment of the present invention for practicing the best mode thereof.
Figure 2:
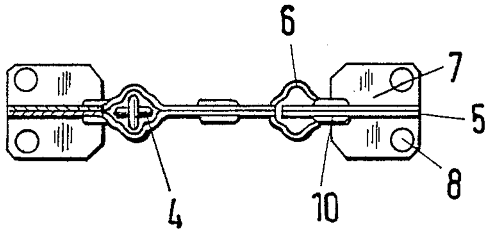
FIG. 2 is a top elevation of a portion of the structure shown in FIG. 1.
Figure 3:
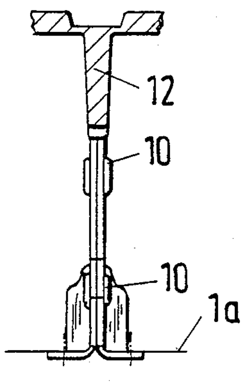
FIG. 3 illustrates a section view taken through a plane as indicated by III—III in FIG. 1.

The guide structure includes two press worked shell pieces 5 each with T-shaped indents 6 in the respective lower portion. As the two shells are put together these indents establish a cross shaped guide as shown in FIG. 2. The shell pieces 5 are interconnected by means of rivets 10. A web tongue 5*a* reaches into the groove of sprocket or chain wheel 3. In addition flange pieces 7 and 8 are provided on these shells, and fastened to but below the bottom plate 1*a* of the housing 1. As can be seen specifically in FIG. 2 the flanges 7 are angled off in relation to the main area of extension of the shells 5. These flanges 7 are provided with bores 8 through which and by means of bolts 13 this chain guide is fastened to the housing 1.

The guide shells 5 are, in addition, provided with guide noses 9 situated above the axis of the sprocket wheel 2. These noses 9 are arch shaped and curved towards each other. By means of these noses the chain is guided in the upper portion of the device, specifically above and around the chain or sprocket wheel. The noses 9 are separated from each other by a gap 11 which is wider than the bottom diameter 2' of the chain or sprocket wheel 4 where narrowed down by means of chain guiding groove. This groove receives the chains which appear standing in any moment, meaning that owing to the vertical orientation the chain guide can be pushed into the housing 1 from below.

The housing 1 has in addition, and particularly in the area of the insertion gap 11, a particular closure piece 12. By means of this piece 12 the open guide is closed whenever and after the guide shells have been inserted in the housing. The closure piece 12 is not subject to any wear during operation and is simply provided for purposes of protection to ensure consistent ease of threading the chain into and out of the casing.

The invention is not limited to the embodiments described above but all changes and modifications thereof, not constituting departures from the spirit and scope of the invention, are intended to be included.

I claim:

1. Chain guide for a chain on and in relation to a sprocket wheel, having a shaft comprising:
   - a housing;
   - a pair of substantially flat complimentary guide shells situated in and fastened to the housing, the shells being interconnected and made as press parts and having, when put together, a pair of vertically extending cross shaped grooves; a plane of partitioning being in a plane of rotation of the sprocket wheel;
   - guide noses above the grooves and facing each other across a narrowing gap and above a portion of the shaft of the sprocket wheel;
   - the sprocket wheel having a groove, the diameter of its bottom is a little smaller than said gap; and
   - means for closing the gap independently from the shells and their connection.

2. Chain guide as in claim 1, the shells being riveted together; the shells having flanges for bolting to a housing for the guide.

* * * * *